Feb. 26, 1952 E. O. KEIZER 2,586,956
SIGNAL AMPLIFYING SYSTEM
Filed Oct. 2, 1950
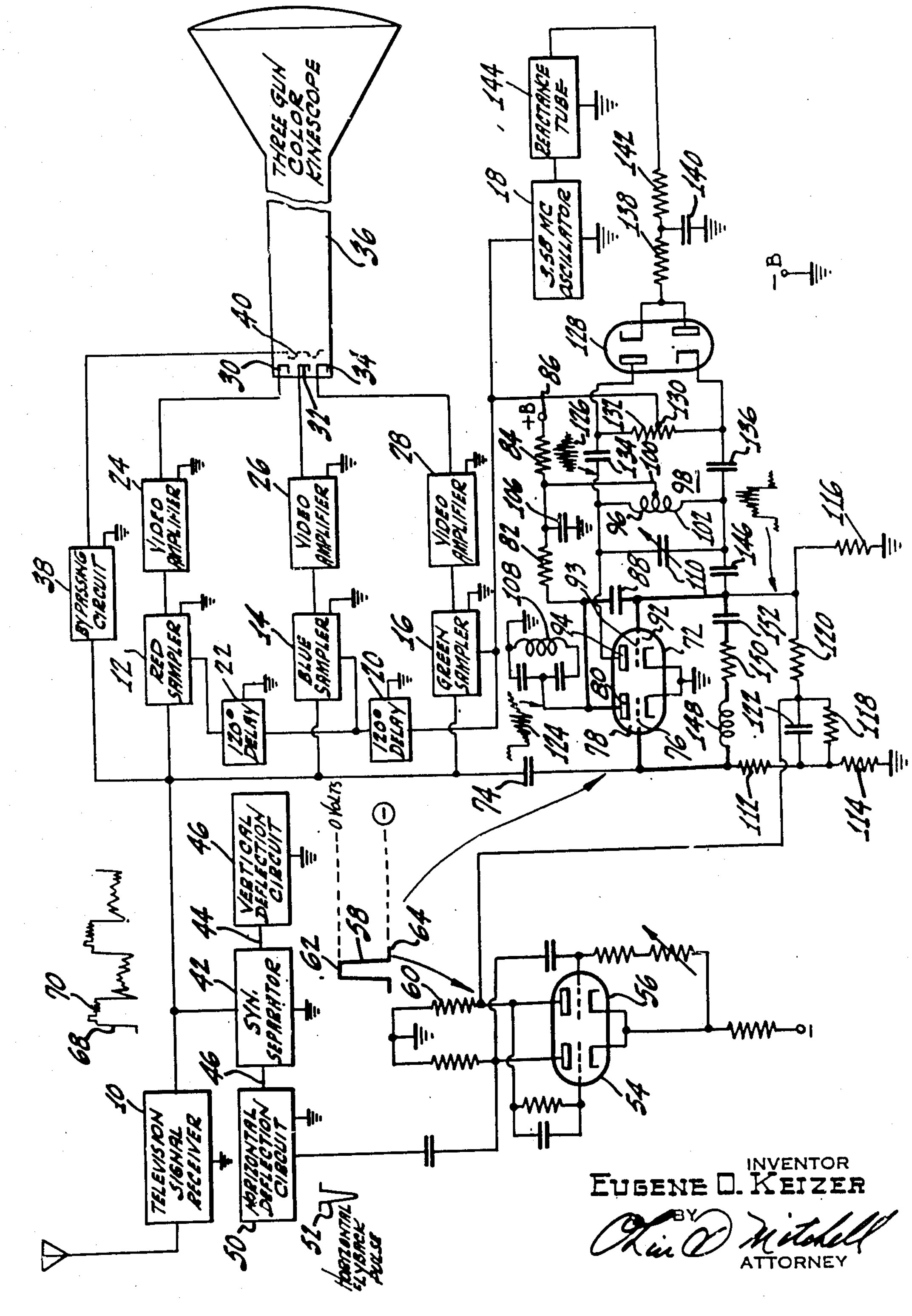
INVENTOR
EUGENE O. KEIZER
BY Olin D. Mitchell
ATTORNEY Patented Feb. 26, 1952

2,586,956

UNITED STATES PATENT OFFICE 2,586,956

SIGNAL AMPLIFYING SYSTEM

Eugene O. Keizer, Princeton, N. J., assignor to Radio Corporation of America, a corporation of Delaware Application October 2, 1950, Serial No. 187,933

10 Claims. (Cl. 250—27)

The present invention relates to improvements in signal amplifying systems and more particularly although not necessarily exclusively to improvements in the neutralization of cascade electron discharge tube amplifiers.

More directly, the present invention is involved with the provision of a novel neutralizing circuit arrangement for cascaded triode amplifiers and particularly where these amplifiers are to be simultaneously gated or switched on and off by auxiliary control signals.

In many types of electrical equipment it becomes expedient to use a sampler type of amplifying circuit such as the gated amplifier or electronic switch. Such an amplifier circuit is generally provided with two input terminals, one adapted to receive intelligence signals and the other adapted to receive a control signal. It is the function of the control signal to turn the amplifier on and off so that it may pass only selected portions of the intelligence signals. In order to obtain more perfect gating action use is sometimes made of two or more gating amplifying stages connected in cascade, the gating or control pulse being applied to all stages simultaneously to turn them on or off as may be required while the intelligence signal is circuited in normal cascade amplifier fashion. Especially where triode amplifiers are used, this cascade system of signal amplification presents a number of problems. The first problem is that of capacitive loading of the gating signal source so that a steep wave front gating signal is difficult to realize; secondly, the triode amplifiers must necessarily be neutralized and, as will be later seen, such neutralization has not heretofore been easy to obtain in view of the common input circuit to all of the amplifiers from the gating control signal source. Numerous undesired feedback loops present themselves in the classical approach to the neutralization of the individual amplifiers in such a circuit. Perhaps no greater need exists for a simple and effective gated amplifier than in present-day systems of dot multiplex color television receiver synchronization. A thorough discussion of the use and place of the gated amplifier in such a color television receiving system is presented in a pamphlet entitled "Recent Developments in Color Synchronization in the RCA Color Television System" by the RCA Laboratories Division of the Radio Corporation of America and dated February 1950. It is there described that the horizontal synchronizing pulses of the received dot multiplex color television signal will have situated on their back porches a burst of synchronizing frequency which, by way of example, may be in the neighborhood of 3.6 megacycles. Gating means are then provided in the receiver for sampling or extracting from the incoming signal the bursts of synchronizing component.

The separated burst is then fed to a frequency comparison circuit which maintains a local oscillator in the receiver at the proper frequency and phase for synchronously conducting well known dot multiplex demodulation of the incoming signal.

Experimentation with gating circuit suitable for use in extracting the burst component from the television signal has led to the conclusion that it is highly desirable to use a plurality of amplifier stages which are connected in cascade in so far as the received television signal is concerned but are simultaneously turned on and off or gated by a control pulse which is so related in time to the back porch of the horizontal synchronizing pulse that only 3.6 megacycle burst component appears at the output of the cascade amplifier. If properly neutralized triode amplifiers are used, for the amplifier stages the above mentioned problems with respect to capacitive loading of the gating signal source as well as the presence of undesirable feed back loops will become of primary concern.

It is therefore an object of the present invention to provide a neutralizing circuit arrangement for cascaded triode amplifiers which will minimize the effects of capacitive loading on terminals connected with the input electrodes of any of the individual stages of the amplifier.

It is another pirpose of the present invention to provide a new and useful signal gating circuit of the cascade variety described above which presents a minimum of undesirable feedback paths.

It is another purpose of the present invention to provide an improved signal gating circuit for separating the burst component from incoming dot multiplex signal color television signals.

In the realization of the above objects and features of advantage the present invention contemplates the use of first and second triode discharge tubes having respective load and polarizing circuits connected between their anodes and cathodes. A coupling capacitor is then provided between the anode of the first triode and the control electrode of the second triode. Phase reversing means are then connected between the anode and control electrode of the second triode to produce a degree of neutralization while neutralization of the first triode is accomplished through th. connection of a resonant circuit between the control electrodes of the first and second triodes. For color television burst separation, a tuned circuit may be coupled with the anode circuits of each of the triodes. The color television signals are then applied directly to the control electrode or grid of the first triode while gating signals synchronized with the arrival of the burst are applied through a resistive isolating network to both of the control electrodes of the first and second triodes.

A better understanding of the present invention as well as an appreciation of its other objects and features of advantage may be obtained from a reading of the following description especially when considered in connection with the accompanying single figure of the drawing in which is shown a combination block and schematic diagram of a dot multiplex color television receiving system in which the present invention finds ready application.

Turning now to the single figure, there is indicated at 10 some form of television signal receiver suitable for the reception and demodulation of dot multiplex color television signal having a burst synchronizing component. Suitable circuitry for this purpose is illustrated and described in another pamphlet entitled "A Simplified Recever for the RCA Color Television System" dated February, 1950 and written by the RCA Laboratories Division of the Radio Corporation of America. The output of the receiver is, as further described in the latter referenced pamphlet. coupled to the input of three sampler circuits 12, 14 and 16, respectively designated as the red, blue and green samplers. These samplers are nothing more than special forms of gated amplifiers with which the present invention is not necessarily concerned but may be applied thereto. Suitable circuitry for these samplers is described in the latter referred to pamphlet.

By way of example, a 3.58 megacycle oscillator at 18 is indicated as a source of gating or sampling signal for the sampler circuits 12, 14 and 16. The 120 degree phase shifting network 20 and 22 provides the necessary staggering of the sampling conducted by the samplers. The outputs of the samplers 12, 14 and 16 are respectively set to corresponding video amplifiers 24, 26 and 28. The output of the amplifiers are, in turn, connected to the cathodes 30, 32 and 34 of a three-gun color kinescope 36 also described in the latter referred to article. A by-passing circuit 38 is also indicated in the figure for by-passing a desired color television signal component around the sampling stages and applying them to the grids 40 of the color kinescope 36.

The output of the television receiver 10 is also applied to a conventional sync separator circuit 42 which separates vertical and horizontal synchronizing signal information from the incoming color television signal. A suitable circuit arrangement for this function is disclosed by way of U. S. Patent Ser. No. 2,207,775 by A. V. Bedford, July 16, 1940. The separated vertical sync pulses appearing at terminal 44 of the sync separator are conventionally applied to the vertical deflection circuit 46 while the horizontal synchronizing pulses appearing at terminal 48 of the sync separator are applied to the horizontal deflection circuit 50. Suitable vertical and horizontal deflection circuits for this purpose are shown in an article entitled "Television Receivers" by Antony R. Wright appearing in the March 1947 issue of the RCA Review. As described in the above RCA Review article, there appears at the output of the deflection circuit a horizontal fly-back pulse which by way of example has been illustrated in the drawings at 52 and is considered as extending in the negative going direction.

The horizontal fly-back pulse 52 is then utilized to synchronize a square wave generating circuit based upon the discharge tubes 54 and 56. The square wave circuit is of Eccles-Jordan type as described in detail on pages 171 through 176 of a book entiled "Ultra High Frequency Techniques" by Brainard, Koehler, Reich, and Woodruff and published by D. Van Nostrand Co., Inc., in 1942. Such a square wave generating circuit is common-place and well-known in the art and since it forms no part of the present invention a detailed description of its operation will be omitted. It is well-known that the right-hand triode 56 of the circuit is periodically rendered conducting and non-conducting to form the square wave 58. This square wave 58 is thereby used by the present invention as a keying pulse for the gated amplifier about to be described. It is noted that due to the connection of the anode of triode 56 to ground potential through resistor 60 that the peak 62 of the saw-tooth wave 58 goes no higher than ground potential or zero volts. This peak voltage represents non-conduction in the triode 56. The negative-going extremity 64 of the square wave 58 of course represents maximum conduction in the discharge tube 56 and represents some D. C. potential which is negative with respect to ground.

As described in the above referenced pamphlet entitled "A Simplified Receiver for the RCA Color Television System" it is necessary to control the 3.58 mc. oscillator 18 in accordance with the burst component of the received color television signal. As stated above, this burst component appears on the back porch of the horizontal synchronizing pulse. This arrangement is shown in the figure at 68. The horizontal sync pulse 68 has a 3.58 mc. burst component at 70 situated on the back porch of the horizontal sync. As further described by the last referred to pamphlet, it is necessary to separate the burst component 70 from the received color television signal. This is accomplished by means of the triode discharge tube shown at 72.

In accordance with the present invention the color television signal appearing at the output of the receiver 10 is coupled by a capacitor 74 to the grid 76 of the left-hand triode section 78. The cathodes of both triode sections are grounded. The anode 80 of the triode section 78 is supplied with polarizing potential through resistors 82 and 84 from the positive B power supply terminal at 86. Voltage variations on the anode 80 are coupled via capacitor 88 to the control electrode or grid of right-hand triode section 92. Positive polarizing potential for the anode 94 of the triode 92 is supplied through the upper section 96 of inductance 98 whose tap 100 is connected with the right-hand terminal of resistor 82. The voltage appearing across the second section 102 of the inductance 98 will of course be in phase with the voltage appearing across the upper section 96 so that with respect to the terminal 100 a push-pull signal appears across the inductance. Terminal 100 is effectively at A. C. ground potential by merit of the capacitor 106. To accentuate the response of the gated stage to the desired burst frequency, a tuned circuit 108 is connected in shunt with the anode circuit of the first triode 78. The output circuit of triode 72 is similarly made resonant at the first frequency by means of a variable capacitor 110. The grid 76 of the triode 78 is connected with ground through resistors 112 and 114 while the grid of triode 92 is connected with ground through resistor 116.

In further accordance with the present invention, the gating pulse 58 for control of the gated amplifier is applied at the junction of the resistances 118 and 120. A capacitor 122 shunts a portion of the resistor 118. The exact manner in which the gating pulse 58 is applied to the resistors 118 and 120, the connection of the capacitor 122, and the bridging of resistor 118 and 120 across the upper terminal of 114 and 116 form the subject matter of my copending U. S. patent application Ser. No. 187,934 filed concomitantly herewith and entitled "Gated Amplifier Circuits." Suffice it to say for the purpose of the present invention that positive going gating pulses appear at the resistors 114 and 116 and that the amplitude of these pulses is sufficient to overcome the negative cutoff bias imposed on the grids of the triodes 78 and 92 which is present under dynamic operating conditions.

The operation of the circuit thus far described is substantially as follows. The positive going keying pulse 58 applied to the grids of the triodes 78 and 92 causes grid current conduction in these triodes. This grid current conduction causes a negative grid current bias to be developed across the resistors 112, 114 and 116. This bias supplements the average negative value of the multivibrator anode so that the grids 76 and 93 of the triodes 78 and 92 are swung to plate current cutoff during the negative going pulse 64 of the keying pulse 58. This means that the triodes 78 and 92 will act to amplify received color signal only during the positive-going portion of the keying pulse 58. Since the keying pulse 58 occurs during the back porch of the horizontal pulse 68 demodulated by the receiver, it follows that the triode 72 will be on only during the burst interval of the received signal.

Consequently, there will appear at the anode 80 of the triode 78 a wave form substantially the same as that indicated at 124. Due to the rather high "Q" of the circuit 108 it is apparent that it takes some time for the 3.58 sinusoidal component to develop. Correspondingly, it takes some time after the occurrence of the keying pulse 58 before the sinusoidal variation to the tank circuit 108 has completely died out. The triode 92 in turn samples the output of the triode 78 so as to give an even cleaner burst wave form indicated, by way of example, at 126. As described above, since the signal appearing across the inductance 98 is a push-pull signal with respect to ground the burst component 126 is applied to the double diode 128 in typical frequency comparison fashion. The output of the oscillator 18 is of course fed to the center tap 130 of resistor 132 connected between the anode of one and the cathode of the other of the two diodes. The diodes are isolated from the DC appearing on the inductance 98 by means of capacitors 134 and 136. The cathode of the one and the anode of the other of the diodes are connected together and also to the low pass filter formed by resistor 138, capacitor 140 and resistor 142. As described in the above referenced pamphlet "A Simplified Receiver for the RCA Color Television System," the D. C. voltage appearing at the right-hand terminal of resistor 142 may be used to control the reactance tube 144 which in turn adjusts the frequency of the oscillator 18 so that it corresponds with the frequency of the received burst.

The fact that discharge tubes 78 and 92 of the gating circuits are triodes requires that some means be provided by accomplishing neutralization. This, in accordance with the present invention is accomplished by means of the capacitor 146 which feeds back voltage onto the grid 93 of the triode 92 which is in phase opposition with the unwanted "feed-through" voltage appearing on the anode 94 of the same triode due to grid plate capacity. This phase relationship exists, of course, because of the previously described push-pull voltage conditions existing across the inductance 98. Neutralization of the first triode 78 is accomplished through the use of inductance 148, resistor 150 and capacitor 152. This series combination feeds back out of phase voltage on the grid 76 of the triode 78 and thus accomplishes neutralization. The neutralization of the triode 92 will be seen to be the well-known Rice "plate-side" type of neutralization while the neutralization of the first triode 78 is substantially the same as well-known "coil neutralization" variety.

The particular choice and circuit arrangement of the neutralization provided by the present invention is extremely important to the successful operation of the gated amplifier stages. By using the particular arrangement of the present invention the circuit capacitor imposed across the output of the multivibrator 56 is kept at a minimum while undesirable additional feedback from the output to the input of the first amplifier is avoided.

In practice the first triode may be thought of as being inductively neutralized. That is, an inductive path is shunted from the anode to grid of the triode. The value of this inductance which is shown at 148 is equal in magnitude to the capacitance reactance of the anode grid path of the tube plus stray capacity thus forming a high impedance and resonant circuit which reduces the feed-through of the tube. The value of inductance 148 is therefore such that its reactance at 3.58 mc. is greater than the reactance of capacitors 152 and 88 at the frequency. The path provided by the inductance 148, resistance 150 and capacitor 152 then becomes the means for applying gating voltage for the second triode grid. The impossibility of maintaining as low a capacitive loading on the multivibrator 56 and providing a minimum of undesirable additional feed-back between the triodes through the use of other combinations of neutralization methods clearly points out the novelty and value of the present invention.

It will be understood, of course, that the purpose of resistor 150 is to damp the transient response which might otherwise be generated in the series circuit of the inductance 148 and capacitor 152. Furthermore, it will be apparent that the particular manner of applying neutralization to the two cascade amplifier stages and the technique of applying signals to these stages disclosed hereinabove is applicable to other circuit arrangements than merely gate-type amplifiers. The present invention is useful in any circuit where in-phase voltages are to be applied to the grids of successive cascade amplifiers while a second and different signal voltage is to be applied to the input only of the cascade amplifier.

Having thus described my invention what is claimed is:

1. In a gated amplifier for electrical circuits, the combination of, a terminal adapted to receive a gating signal of desired duration, an intelligence signal terminal adapted to receive an electrical intelligence signal which is to be gated by said gating signal, a first and a second electron discharge tube each having at least an anode, cathode and control electrode, a respective load and polarizing circuit connected between the anode and cathode of each of said first and second discharge tubes, a capacitor connected between said first discharge tube anode and said second discharge tube control electrode, means connected with said second discharge tube load circuit and said second discharge tube control electrode for feeding onto the second tube control electrode voltages which are opposite in phase to voltages appearing on said second tube anode, an inductance and a capacitance connected in series combination between the control electrodes of said first and second discharge tubes, impedance means connected with said gate signal terminal and said first and second tube control electrodes for concomitantly applying thereto the gating signal, and means for coupling said first tube control electrode to said intelligence signal terminal.

2. Apparatus according to claim 1 wherein said intelligence signal includes a periodically recurrent index component, and wherein the gating signal for said gating signal terminal is timed to occur during said index component, and wherein the load circuit for said second discharge tube includes an inductance-capacitance resonant circuit resonant to a frequency value which is integrally related to the recurrence frequency of said index component.

3. Apparatus according to claim 1 wherein said intelligence signal includes a periodically recurrent index component, and wherein the gating signal for said gating signal terminal is timed to occur during said index component, and wherein said series combination inductance and capacitance is made resonant to a frequency integrally related to the recurrence frequency of said index component.

4. Apparatus according to claim 1 wherein said opposite phase voltage feeding means includes a timed circuit resonant to the frequency of said index component.

5. In a signal amplifying system, a first and second electron discharge tube each having at least an anode, cathode and control electrode, a respective load and polarizing circuit connected between the anode and cathode of each of said first and second discharge tubes, a capacitor connected between said first discharge tube anode and said second discharge tube control electrode, means connected with said second discharge tube load circuit and said second discharge tube control electrode for feeding onto the second tube control electrode voltages which are opposite in phase to voltages appearing on said second tube anode, an inductance and a capacitance connected in series combintion between the control electrodes of said first and second discharge tubes, and a single input circuit connected between the control electrodes and cathodes of said discharge tubes.

6. Apparatus according to claim 5 wherein said opposite phase voltage feeding means comprises an inductance and capacitance connected in parallel, a part of said inductance being connected in series with said second tube anode-cathode circuit with means for applying the voltages appearing across the remainder of the inductance to said first discharge tube control electrode.

7. In an electrical circuit, a first and second electron discharge tube each having at least an anode, cathode and control electrode, a polarizing potential power supply termial, a datum terminal forming a reference for said power supply terminal, means connecting each of said first and second tube cathodes with said datum terminal, a first resistance connected from said first tube anode to said power supply terminal, a first parallel tuned circuit capacitively coupled to said first tube anode, a tapped inductance having a first and second section defined by the tap and the inductance extremities, connections placing said inductance first section in series with a circuit from said second tube anode and said power supply terminal, a capacitor connected in shunt with said inductance to form a second parallel tuned circuit, a capacitor connected from said inductance second section to said second tube control electrode, a second inductance and another capacitance connected in series between the control electrodes of said first and second tubes, and grid return resistances connecting said first and second tube control electrodes with said datum terminal.

8. Apparatus according to claim 7 wherein there is additionally provided an isolating resistance which is connected between said first tube control electrode and said grid return resistances, and wherein there is also provided a first signal input circuit connected with said grid return resistances and a second signal input connected on the control electrodes side of said isolating resistance.

9. Apparatus according to claim 8 wherein there is additionally provided means for biasing said first tube into static anode current cutoff, and wherein said first input circuit is designated to receive positive going keying pulses of sufficient amplitude to produce momentary conduction in said first tube while said second circuit is adapted to receive an intelligence signal from which is to be extracted signal information during the keying pulses.

10. Apparatus according to claim 9 wherein said intelligence signal includes a periodic component having a predetermined frequency and wherein said first and second timed circuits are resonant to this predetermined freqency.

EUGENE O. KEIZER.

REFERENCES CITED

The following references are of record in the file of this patent:

UNITED STATES PATENTS

| Number | Name | Date |
|---|---|---|
| 2,537,065 | Lester et al. | Jan. 9, 1951 |